June 18, 1968  C. M. SCHOTT, JR  3,388,426
BLOWN FILM DIE APPARATUS

Filed June 9, 1966  3 Sheets-Sheet 2

United States Patent Office 3,388,426
Patented June 18, 1968

3,388,426
BLOWN FILM DIE APPARATUS
Charles M. Schott, Jr., Gloucester, Mass., assignor to Gloucester Engineering Co. Inc., Gloucester, Mass., a corporation of Massachusetts
Filed June 9, 1966, Ser. No. 556,346
5 Claims. (Cl. 18—14)

ABSTRACT OF THE DISCLOSURE

Compact rotatable die ring assembly for plastic film. The collector for electrical power to the rotating assembly surrounds but is spaced from the conduit for molten plastic, defining an air space therebetween. Disclosed also are provisions for air flow through the space, blowers on the compact rotating assembly, the die assembly formed by a hollow spindle which supports the die, conduits the molten plastic and is surrounded by the collector-slip ring assembly, and the collector formed by a cylinder mounted on an apertured disc.

---

This invention relates to apparatus for forming plastic film, and in particular to dies and related structure for use in the blown film process.

In this process a tubular film issues from a die opening, is subjected to cooling by a flow of air upon its exterior, and then proceeds upwardly along a tower as it is expanded and oriented by an air bubble captured within the tube, after which the tube is flattened, optionally slit, and taken up on a roll.

One of the objects of the invention is to provide an improved die apparatus from the standpoints of improved product, simplicity, reliability, ease of maintenance, and capital cost.

Particular objects include the provision of a compact die apparatus which occupies little space and is capable of producing improved rolls of film which are smoothly wound and have uniform distribution of any gauge variations that occur in the film.

The objects also include the provision of such a die apparatus which requires a minimum path length for the molten plastic from extruder to die, minimizing degradation of the plastic, and a minimum height from floor to the top of the tower, minimizing capital cost.

The invention features a die member rotatably mounted upon a seal structure through which it receives a supply of molten plastic, together with heaters associated with the die member and an electrical collector assembly surrounding but spaced from the conduit for the molten plastic.

Advantageously, the collector assembly extends downwardly from its point of attachment to the die assembly, and surrounds the seal structure.

Another feature of the invention is an insulating air space between the collector assembly and the conduit, with electric heaters surrounding the latter.

Another feature is the axial mounting on a cylinder of the various conductive rings of the collector assembly, a surrounding brush-holder housing and dust seals at opposite ends of the housing and cylinder, so that the collector elements are housed in a protective environment.

Another feature is the direct mounting of an air ring assembly and associated blowers directly on the die, with power taken from additional conductive rings which surround the conduit for the molten plastic.

Still another feature is the provision of the entire assembly with a height less than that of the operators and maintenance men.

These features and others will be described in detail in connection with the accompanying drawings wherein.

Figure 1:
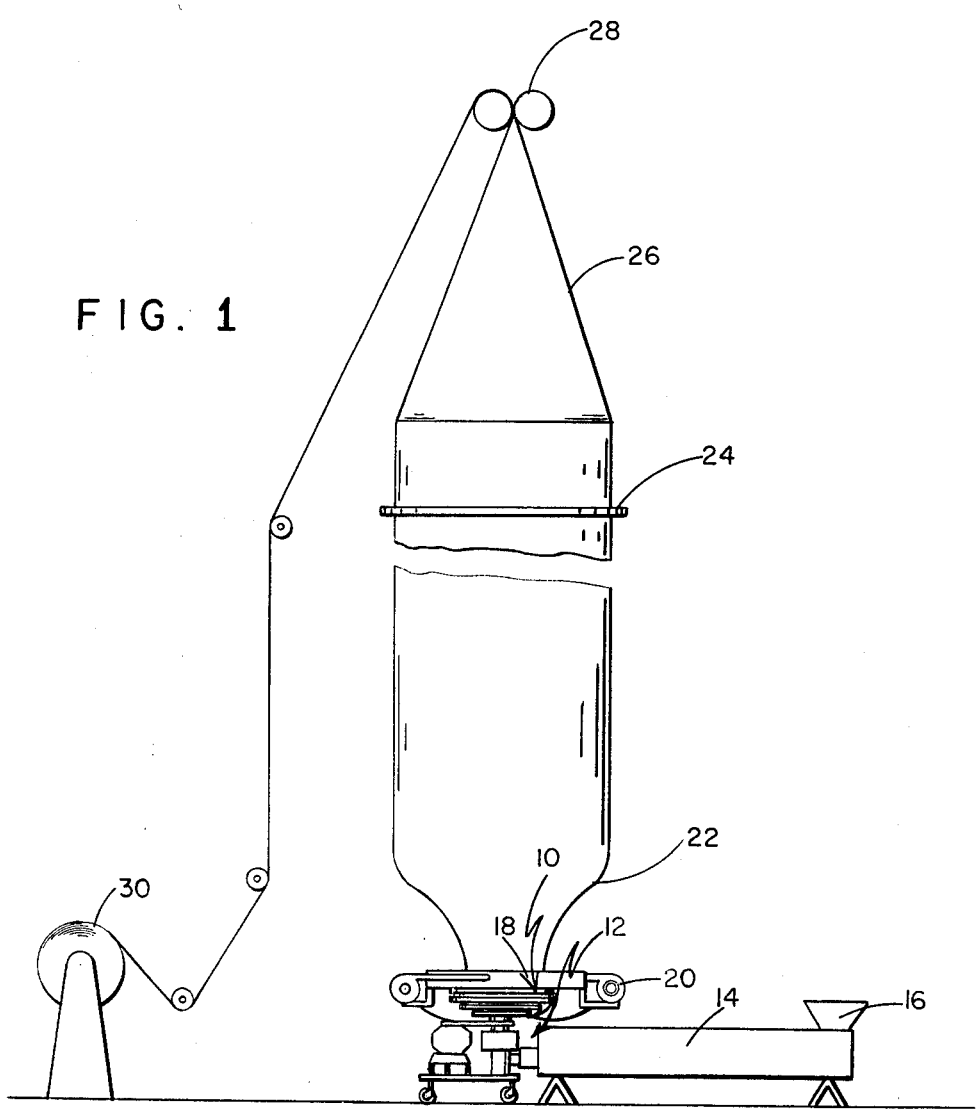
FIG. 1 is a partially diagrammatic side view of a blown-film line incorporating a preferred embodiment of the die apparatus of the invention.

Referring to the drawings the horizontally disposed circular die ring 10 is disposed over a conduit 12 which receives a supply of molten plastic under pressure from extruder 14. The plastic raw material, e.g., pellets or powder, is introduced to the extruder through hopper 16.

The exterior of the tubular film is exposed to a flow of cooling air from air ring 18 produced by blowers 20 mounted therewith, and the plastic tube 22 then proceeds up the tower. First it is subjected to expanding forces applied by an air bubble captured within the tube, then preferably subjected to a gusseting assembly 24, then is collapsed along path 26, to nip rollers 28, from which the film is led to take up roll 30.

According to the invention it is realized that a collector assembly and the other components suitable to rotary action should be provided in a surrounding relationship to the conduit for the hot plastic to provide a superior heated rotary die assembly.

It will be appreciated that, by use of a rotary die assembly, any variaions in film thickness attributable to defects along the die circle, or along the circle of the air ring, are progressively distributed about the axis of the tube. Accordingly, in the final roll, instead of the variation in thickness being concentrated at given points along the axis of the take-up roll, or in certain regions, the variations are uniformly distributed by virtue of the rotatation of the imperfections of the die assembly. Accordingly, a uniform roll is produced which is suitable for high speed converting operations and the like, while non-uniform tensions and distortions of the rolled product are avoided.

The surrounding relationship of the collector assembly contributes compactness and adds nothing to the length of the molten plastic path or the floor-to-tower-top height, while the spaced-apart relationship of the collector assembly and conduit provide a suitable insulating effect, particularly when coupled with a chimney-action flow of air.

Figures 2, 4:
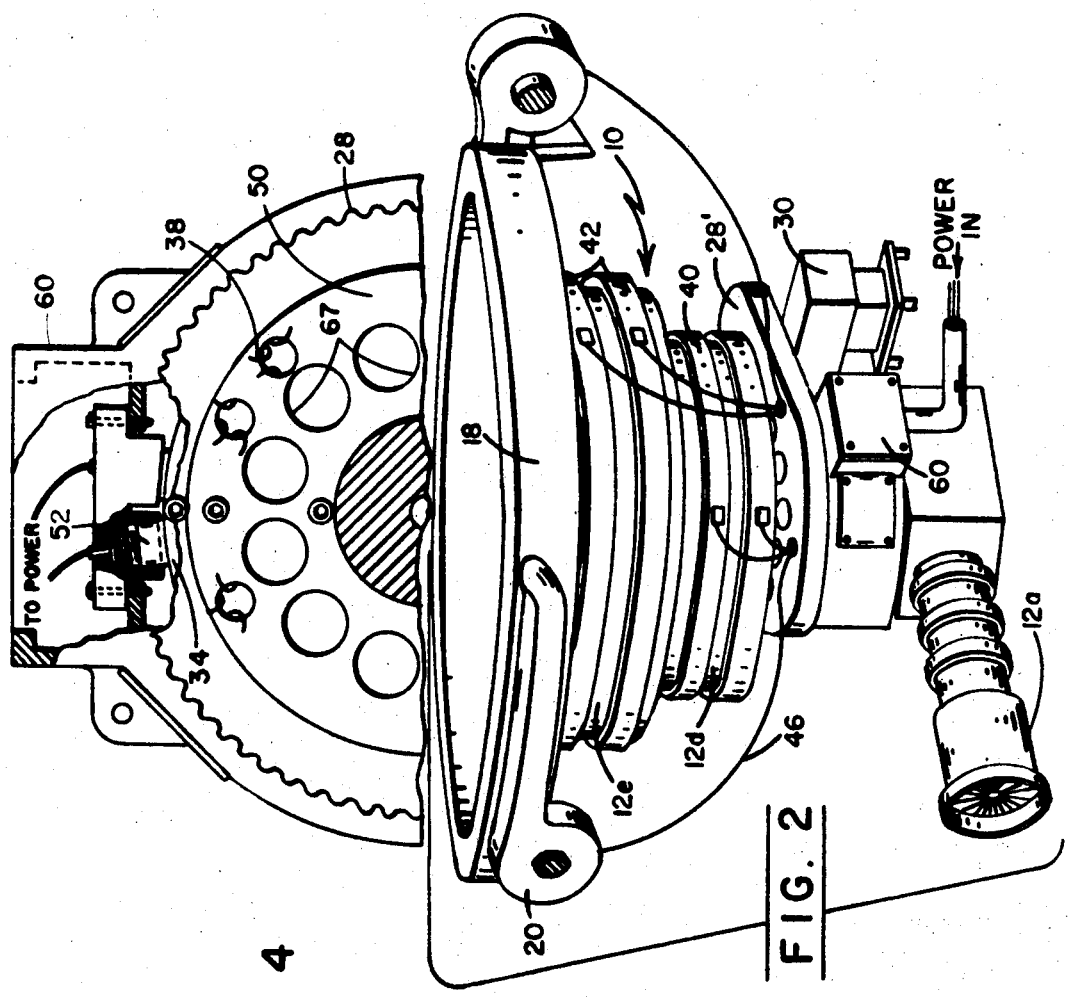
FIG. 2 is a side view on an enlarged scale of the die apparatus of FIG. 1.
FIG. 4 is a horizontal sectional view of FIG. 3.
Figure 3:
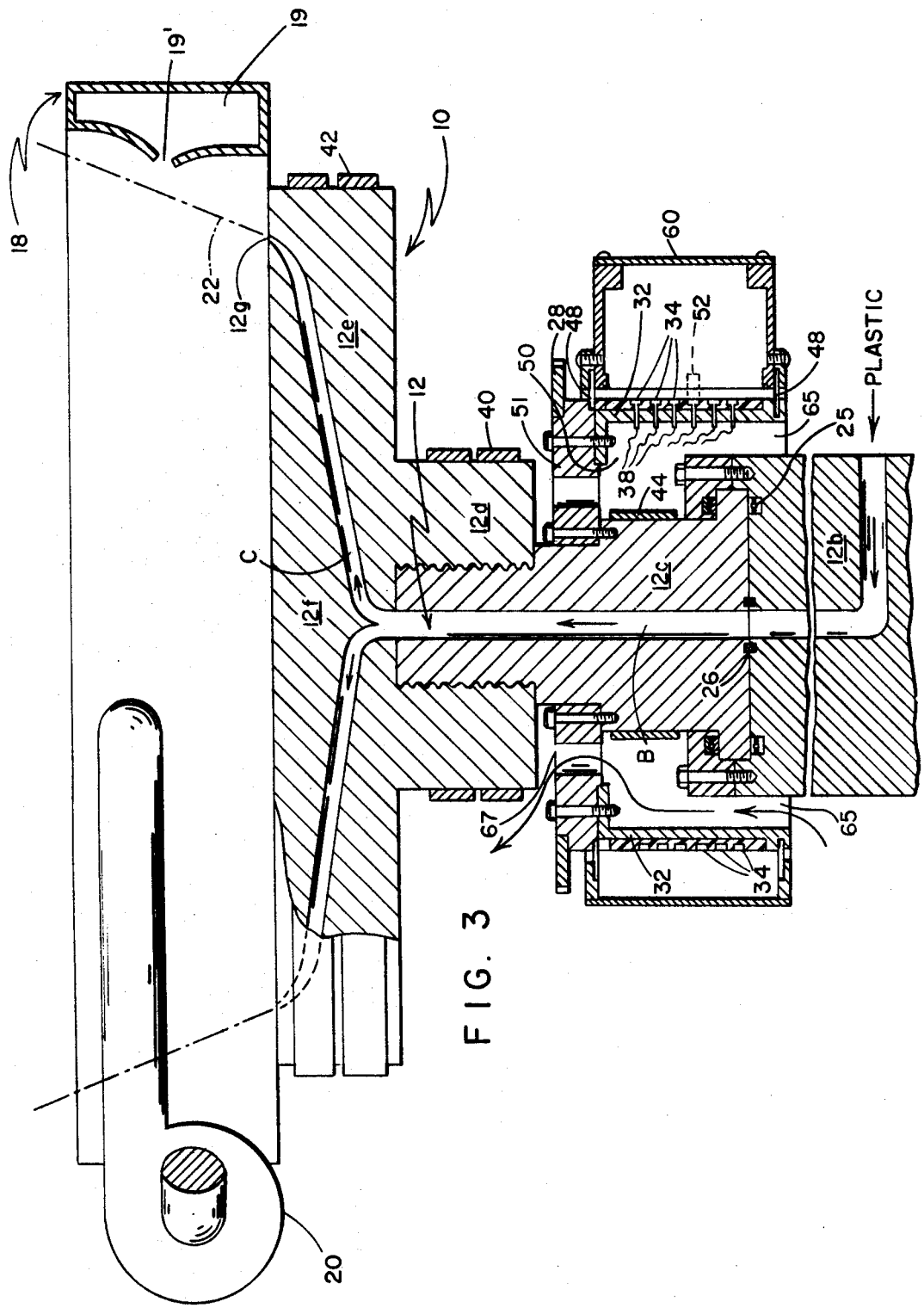
FIG. 3 is a vertical sectional view of the die apparatus of FIG. 1.

Referring to FIGS. 2 and 3 the conduit for the molten plastic is defined by an extruder adaptor section 12a, a diverter section 12b, a rotator section 12c, and a die ring 10. The rotator section is mounted by suitable bearings 25. A temperature-resistant seal 26, e.g., of fluorocarbon plastic, is disposed between sections 12b and 12c near the bore B. The upper portion of rotator 12c has the form of a threaded spindle to which is secured the die ring 10, the die ring comprising threaded flange 12d and enlarged upper portion 12e. The bore B opens into a conical passage C, defined by center member 12f, into which the plastic flows, and from which the plastic issues, at outlet 12g, in the form of a molten tube.

A set of band heaters 40 surrounds the flange 12d of the die ring and a second set of heaters 42 surrounds upper portion 12e to maintain the plastic in a molten state. Preferably another heater band 44 surrounds rotator body 12c for the same purpose.

An air ring assembly 18 is mounted upon the die ring for the purpose of cooling the plastic film soon after it issues from the die for the purpose of giving the properties needed for further processing. The air ring 18 comprises an annular chamber 19, with suitable baffling (not shown), annular outlet 19' for directing air upon the film, and a multiplicity of blowers mounted in spaced apart relationship on the air ring for producing an appropriate supply of air.

It is an important feature of the invention that the entire die and air ring assembly are mounted to rotate. I have realized that air sources are a considerable cause of variation in the thickness of the film, and rotation of them, as well as the air outlets and the die itself, distribute the variations about the tube and thus spread them evenly across the final roll.

To effect rotation in this preferred embodiment, a sprocket gear 28 is secured to the rotator 12c, and a drive chain, not shown, protected by guard 28', is driven by motor 30.

Another important feature is the particular construction of the collector assembly by which electrical energy reaches the various elements of the rotating assembly. The mounting plate 51, to which the sprocket 28 is secured, also carries a downwardly extending cylinder 32 carrying, in cylindrical array, a multiplicity of slip rings 34 insulated from each other by potting material 36, e.g., epoxy plastic. This cylinder and slip rings surround the conduit of the molten plastic, and are spaced therefrom, leaving an insulating air space 50 therebetween. A set of stationary brushes 52, mounted by housing 60, are connected to corresponding terminals to transfer appropriate power from an exterior source to the slip rings. Conductors 38 are connected to the slip rings, and conduct power to heater bands 40 and 42, preferably a further heater band 44 surrounding the rotator 12c, the blowers 20, and appropriate thermal controls, not shown.

The housing 60 surrounds the brushes and rings, and felt seal discs 48 extend from the housing to the cylinder 32, whereby a dust free chamber is provided, thus protecting the critical electrical transfer regions from dust produced by plastic placed in the hopper 16, which I appreciate to be necessary for proper operation.

A further important feature lies in the provision of an opening 65 between the lower part of cylinder 32 and the rotator 12c, together with openings 67 provided in the mounting plate 51. Thus the air space 50 is vented, and a chimney effect is obtained, air heated by the rotator 12c and the above heated structure rising, and cool air entering at the bottom, through opening 65. Accordingly the slip ring assembly, though near, is effectively insulated from the heated plastic conduit, and the insulation and other components of the collector assembly are protected from the heat of the conduit. Thus the conduit may be heated between 350 to 400° F. while the insulating material may be held at a safe temperature, e.g., 135° F. Other advantages attained are the possibility of relatively close spacing of the collector assembly to the heated conduit, the use of relatively inexpensive insulating materials, and avoidance of distortion when the apparatus is heated and cooled.

It will be appreciated that variations in the specific details can be made within the spirit and scope of the claims.

What is claimed is:
1. Apparatus for forming plastic film comprising means defining a conduit for molten plastic including a stationary conduit section adapted to receive molten plastic and a rotary die ring assembly rotatably supported and driven relative to said stationary conduit section and connected thereto to receive molten plastic, said die ring assembly adapted to produce a tube of plastic film, a circular collector support member secured to said die ring assembly and extending generally in the axial direction, surrounding but spaced from a portion of the conduit for said molten plastic, defining an air space therebetween, a multiplicity of slip rings mounted on said supporting member, stationary brushes engaged with said slip rings adapted to conduct electrical current thereto, and electrical means including a heater in a conductive relation to and movable with the rotary die ring assembly for heating said plastic as it flows therethrough, said heater connected to receive power from said slip rings.

2. The apparatus of claim 1 including upper and lower air flow openings communicating with the space between said circular support member and said conduit, adapted to pass an upward stream of air therebetween.

3. The apparatus of claim 1 wherein an air ring is supported above said die ring assembly, adapted to rotate therewith, said air ring defining an annular outlet adapted to expose film issuing from said die to a flow of cooling air, a plurality of electrical rotary blowers connected to said air ring and adapted to rotate therewith, said blowers connected to receive power from said slip rings.

4. The apparatus of claim 1 wherein said die ring assembly comprises a rotator body supported by bearings upon a stationary conduit section, with a seal disposed therebetween, the upper portion of said rotator defining a threaded spindle, a die ring threadably secured to said spindle, said collector support secured to said rotator and extending downwardly, substantially surrounding said rotator.

5. The apparatus of claim 1 wherein a disc member is secured to said die ring assembly, a sprocket means supported by said disc member and engaged with an endless drive member, a cylinder secured to said disc and extending downwardly therefrom, a pluraltiy of collector rings mounted in axially spaced relationship upon said cylinder, the bottom of said cylinder spaced from said conduit, defining a lower air passage, and a multiplicity of openings in said disc communicating with the space between said cylinder and said conduit, defining an upper air passage.

References Cited
UNITED STATES PATENTS 2,632,206   3/1953   Pierce _____ 18—145 XR

FOREIGN PATENTS 987,809   3/1965   Great Britain.

WILLIAM J. STEPHENSON, *Primary Examiner.*